United States Patent
Jadallah et al.

(10) Patent No.: US 12,106,240 B2
(45) Date of Patent: Oct. 1, 2024

(54) SYSTEMS AND METHODS FOR ANALYZING USER PROJECTS

(71) Applicants: Jamil Jadallah, Kensington, MD (US); Robert Kwesi Amanfu, San Francisco, CA (US)

(72) Inventors: Jamil Jadallah, Kensington, MD (US); Robert Kwesi Amanfu, San Francisco, CA (US)

( * ) Notice: Subject to any disclaimer, the term of this patent is extended or adjusted under 35 U.S.C. 154(b) by 502 days.

(21) Appl. No.: 16/900,917

(22) Filed: Jun. 13, 2020

(65) Prior Publication Data

US 2021/0027234 A1    Jan. 28, 2021

Related U.S. Application Data

(60) Provisional application No. 62/833,765, filed on Apr. 14, 2019.

(51) Int. Cl.

| | |
|---|---|
| *G06Q 10/06* | (2023.01) |
| *G06F 16/36* | (2019.01) |
| *G06F 16/383* | (2019.01) |
| *G06N 5/022* | (2023.01) |
| *G06Q 10/0631* | (2023.01) |
| *G06Q 10/0635* | (2023.01) |

(52) U.S. Cl.
CPC ... *G06Q 10/063116* (2013.01); *G06F 16/367* (2019.01); *G06F 16/383* (2019.01); *G06N 5/022* (2013.01); *G06Q 10/063114* (2013.01); *G06Q 10/06313* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 2014/0278719 A1* | 9/2014 | Pinel | G06Q 10/06316 705/7.26 |
| 2017/0083428 A1* | 3/2017 | Champlin-Scharff | G06N 20/00 |

(Continued)

OTHER PUBLICATIONS

Choetkiertikul, M., Dam, H.K., Tran, T., Ghose, A. and Grundy, J., 2017. Predicting delivery capability in iterative software development. IEEE Transactions on Software Engineering, 44(6), pp. 551-573 (Year: 2017).*

*Primary Examiner* — Patricia H Munson
*Assistant Examiner* — Marjorie Pujols-Cruz
(74) *Attorney, Agent, or Firm* — Bayes PLLC

(57) ABSTRACT

Systems and methods for analyzing user project data is provided. In an example, a system for analyzing a user project includes a memory storing computer-readable instructions and at least one processor communicatively coupled to the memory. The computer-readable instructions, when executed by the at least one processor, cause the at least one processor to perform operations including accessing a first set of metadata associated with the user project, accessing a second set of metadata associated with a plurality of reference projects, and determining an ontology based on at least the first and second sets of metadata respectively associated with the user project and the plurality of reference projects. The operations also include determining, based on the ontology, a subgroup of reference projects from the plurality of reference projects. The operation further includes determining an assessment model for assessing at least one metric of the user project.

20 Claims, 11 Drawing Sheets

(56) References Cited

U.S. PATENT DOCUMENTS

| | | | |
|---|---|---|---|
| 2018/0196871 A1* | 7/2018 | Butler | G06F 40/205 |
| 2018/0211195 A1* | 7/2018 | Trammell | G06Q 10/06312 |
| 2018/0260760 A1* | 9/2018 | Srivastava | G06N 5/04 |
| 2019/0121807 A1* | 4/2019 | Boutros | G06F 16/9024 |
| 2019/0155577 A1* | 5/2019 | Prabha | G06N 20/00 |
| 2020/0134058 A1* | 4/2020 | Liu | G06F 16/2379 |
| 2020/0327467 A1* | 10/2020 | Davies | G06Q 10/06312 |

* cited by examiner

```
{'issue_1': {'url': 'https://api.github.com/repos/airbnb/knowledge-repo/issues/554',    602-1
  'repository_url': 'https://api.github.com/repos/airbnb/knowledge-repo',               602-2
  'labels_url': 'https://api.github.com/repos/airbnb/knowledge-repo/issues/554/labels{/name}',
  'comments_url': 'https://api.github.com/repos/airbnb/knowledge-repo/issues/554/comments',
  'events_url': 'https://api.github.com/repos/airbnb/knowledge-repo/issues/554/events',
  'html_url': 'https://github.com/airbnb/knowledge-repo/pull/554',
  'id': 626204484,
  'node_id': 'MDExOlB1bGxSZXF1ZXN0NDI0MjQwMjc2',
  'number': 554,
  'title': 'fix bug in assertion',                                                       602-3
  'user': {'login': 'naoyak',
    'id': 3279641,
    'node_id': 'MDQ6VXNlcjMyNzk2NDE=',
    'avatar_url': 'https://avatars1.githubusercontent.com/u/3279641?v=4',
    'gravatar_id': '',
    'url': 'https://api.github.com/users/naoyak',
    'html_url': 'https://github.com/naoyak',
    'followers_url': 'https://api.github.com/users/naoyak/followers',
    'following_url': 'https://api.github.com/users/naoyak/following{/other_user}',
    'gists_url': 'https://api.github.com/users/naoyak/gists{/gist_id}',
    'starred_url': 'https://api.github.com/users/naoyak/starred{/owner}{/repo}',
    'subscriptions_url': 'https://api.github.com/users/naoyak/subscriptions',
    'organizations_url': 'https://api.github.com/users/naoyak/orgs',
    'repos_url': 'https://api.github.com/users/naoyak/repos',
    'events_url': 'https://api.github.com/users/naoyak/events{/privacy}',
    'received_events_url': 'https://api.github.com/users/naoyak/received_events',
    'type': 'User',
    'site_admin': False},
  'labels': [],
  'state': 'closed',                                                                     602-4
  'locked': False,
  'assignee': None,
  'assignees': [],
  'milestone': None,
  'comments': 1,
  'created_at': '2020-05-28T04:27:59Z',                                                  602-5
  'updated_at': '2020-05-28T05:15:53Z',
  'closed_at': '2020-05-28T05:15:47Z',
  'author_association': 'COLLABORATOR',
  'pull_request': {'url': 'https://api.github.com/repos/airbnb/knowledge-repo/pulls/554',
    'html_url': 'https://github.com/airbnb/knowledge-repo/pull/554',
    'diff_url': 'https://github.com/airbnb/knowledge-repo/pull/554.diff',
    'patch_url': 'https://github.com/airbnb/knowledge-repo/pull/554.patch'},
  'body': 'Description of changeset: \r\nFound a bug in #547.\r\nTest Plan: \r\n\r\n'}}
```

| ASSESSMENT MODEL | MODEL/ ALGORITHM | ASSESSMENT OUTCOME |
|---|---|---|
| SUCCESS RATE | MODEL I | 0.7 |
| AVERAGE COMPLETION TIME OF AN ISSUE | MODEL II | 15 |

SYSTEMS AND METHODS FOR ANALYZING USER PROJECTS

CROSS-REFERENCE TO RELATED APPLICATION

This application claims the benefits of priority to Provisional Application No. 62/833,765, filed Apr. 14, 2019, the entire contents of which are expressly incorporated herein by reference.

TECHNICAL FIELD

The present disclosure relates generally to the field of software project development and analyses, and more particularly, to systems and methods for processing and analyzing user projects based on data repositories obtained or generated from various data sources.

BACKGROUND

There is a hidden risk within organizations who rely on software to achieve their business outcomes. Typically, the risk includes, e.g., projects not being completed on time and projects not being completed successfully. The traditional project management methodologies (e.g., Waterfall, Agile, XP, etc.) and associated collaboration tools (e.g., GitHub, JIRA, Microsoft Project and Slack) are unable to effectively identify this risk. In addition, there is a desire within these organizations to better understand how the software is being built but the ability to access the right information to intervene and reduce the risk of it being built inefficiently or incorrectly is unavailable. The need for this insight is required for managers to make better informed decisions on costs, collaboration challenges, avoidable pitfalls, misalignment or a lack of shared understanding. Examples of such insight include relationships between chunks of software development work (known as "stories"), pain points that teams have been going through, and experience gained by individual developers working on similar stories.

SUMMARY

In one example, a system for analyzing a user project is provided. The system includes a memory that stores computer-readable instructions and at least one processor communicatively coupled to the memory. The computer-readable instructions, when executed by the at least one processor, cause the at least one processor to perform operations including accessing a first set of metadata associated with the user project, accessing a second set of metadata associated with a plurality of reference projects, and determining an ontology based on at least the first and second sets of metadata respectively associated with the user project and the plurality of reference projects. The ontology represents interrelations between the user project and the plurality of reference projects under a framework of categories. The operations also include determining, based on the ontology, a subgroup of reference projects from the plurality of reference projects. Each reference project in the subgroup has a level of relevance to the user project exceeding a threshold. The operations further include determining an assessment model for assessing at least one metric of the user project based on the subgroup of reference projects, and applying the assessment model to the first set of metadata to generate an assessment outcome.

In another example, a method for analyzing a user project is provided. The method includes accessing a first set of metadata associated with the user project, accessing a second set of metadata associated with a plurality of reference projects, and determining an ontology based on at least the first and second sets of metadata respectively associated with the user project and the plurality of reference projects. The ontology represents interrelations between the user project and the plurality of reference projects under a framework of categories. The method also includes determining, based on the ontology, a subgroup of reference projects from the plurality of reference projects. Each reference project in the subgroup has a level of relevance to the user project exceeding a threshold. The method further includes determining an assessment model for assessing at least one metric of the user project based on the subgroup of reference projects and applying the assessment model to the first set of metadata to generate an assessment outcome.

In a further example, a non-transitory computer-readable medium is provided. The non-transitory computer-readable medium storing instructions that, when executed by at least one processor, cause the at least one processor to perform a method for analyzing user project data. The method includes accessing a first set of metadata associated with the user project, accessing a second set of metadata associated with a plurality of reference projects, and determining an ontology based on at least the first and second sets of metadata respectively associated with the user project and the plurality of reference projects. The ontology represents interrelations between the user project and the plurality of reference projects under a framework of categories. The method also includes determining, based on the ontology, a subgroup of reference projects from the plurality of reference projects, wherein each reference project in the subgroup has a level of relevance to the user project exceeding a threshold. The method further includes determining an assessment model for assessing at least one metric of the user project based on the subgroup of reference projects and applying the assessment model to the first set of metadata to generate an assessment outcome.

BRIEF DESCRIPTION OF THE DRAWINGS

FIGS. 6A-6E each illustrates certain features of an exemplary system, according to embodiments of the disclosure.

DETAILED DESCRIPTION

Figure 1:
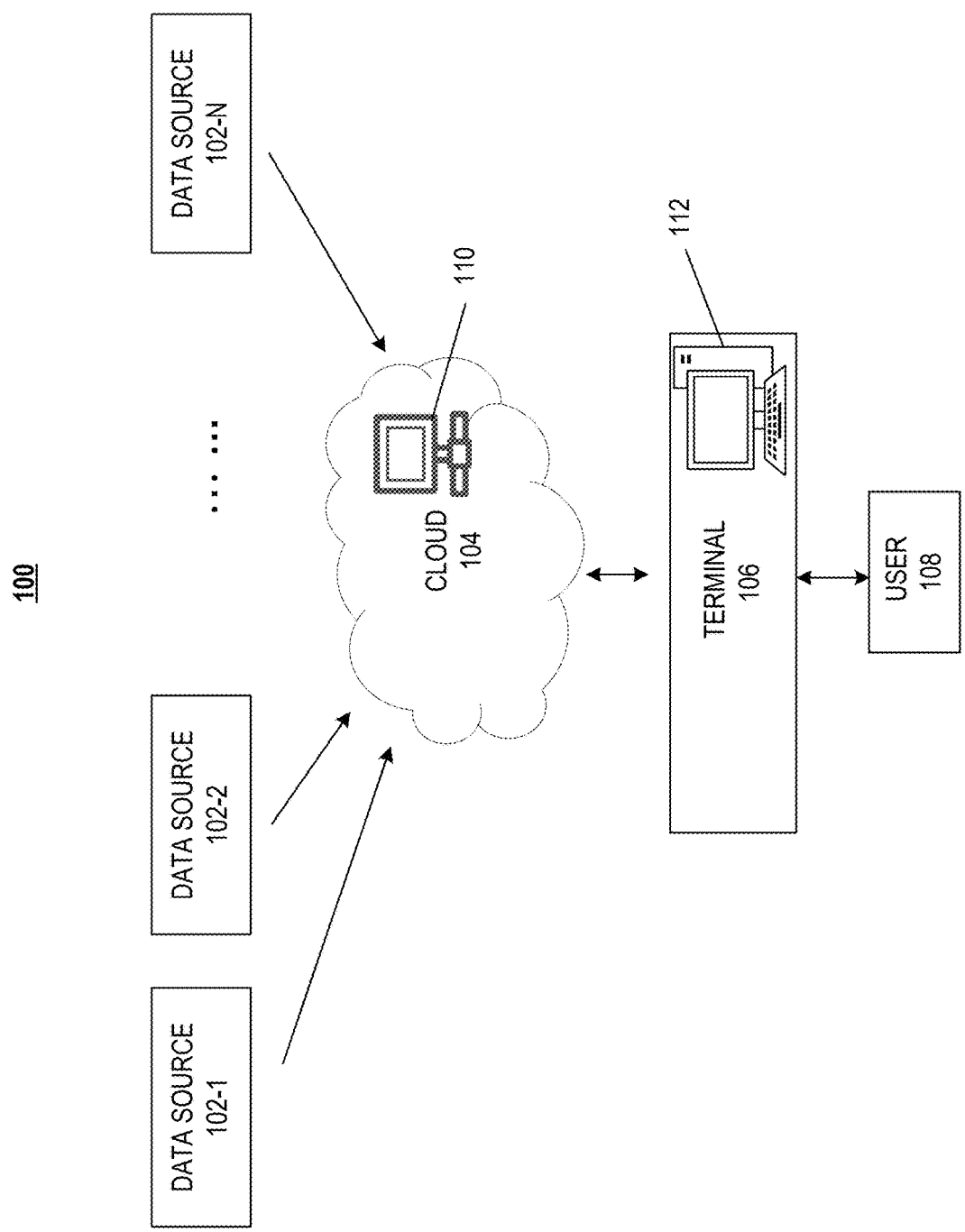
FIG. 1 illustrates an exemplary system for analyzing user projects, according to embodiments of the disclosure.

An existing issue in software project management is keeping track of all the projects teams are working on.

Software development metrics (e.g., quantitative assessments) can provide information on the projects each team is working on but often lack context. This is due to conventional software tools and methodologies not sufficiently representing the true state of development in on-going projects. For example, a leader of a software project often has access to the number of tasks completed in a unit of time but has little insight in what was done specifically in each task and how the tasks relate to the overall software project. To understand each task and the correlation amongst the tasks in the overall software project, a guide (commonly the agile coach, project manager, or a technical lead who is familiar with the work being completed) who can read tasks and understand the context behind the project is needed. The guide is often a rare commodity and there are not enough to address the large market need or effectively scale. Automated solutions are needed to solve the issue.

Embodiments of the present disclosure provide systems and methods for analyzing user projects to identify opportunities in optimization of team inputs and outputs. Exemplary systems and methods can improve the efficiency of project execution and increase probability of success. For example, embodiments of the present disclosure enable an organization with a plurality of software teams working on relevant projects to identify bottlenecks to success, e.g., common problems that slow down software delivery, areas of collaboration for teams to improve, and hiring gaps for management to bridge. The identification of the bottlenecks can be more efficiently realized using the disclosed methods and systems, saving both time and money.

Embodiments of the present disclosure provide systems and methods for analyzing user project data using its interrelationships with other reference projects to identify opportunities for optimizing team inputs and outputs. An exemplary system may receive a user project, which may include user project data (hereinafter, the user project may also be represented by its user project data), and determine an ontology between the user project data and a plurality of reference projects that are collected from one or more data sources. The plurality of reference projects may each include respective reference project data, which may collectively form general data (hereinafter, the plurality of reference projects may also be represented by the general data). The ontology may represent the interrelationships amongst the user project data and the general data. In some embodiments, the ontology may be obtained using at least metadata associated with the user project (e.g., contained in the user project data) and metadata associated with the plurality of reference projects (e.g., contained in the general data). For example, metadata can include text data. Based on the ontology, the system may determine, from the general data, a subgroup of reference projects that are relevant to (e.g., similar to) the user project. One or more assessment models that can assess/predict various aspects/metrics of the user project can be built based on the subgroup of reference projects. In some embodiments, the assessment model(s) can be trained and tested using the metadata associated with the reference projects in the subgroup to each precisely reflect a function between one or more inputs (e.g., metadata associated with the user project data) and an output (e.g., an aspect/metric). Therefore, the assessment model(s) can be used to predict one or more aspects/metrics of the user project based on the metadata associated with the user project data. For example, the output can include a success rate and a project completion time. The system can then determine one or more inputs (e.g., factors) that contribute most to a high success rate and/or a short project completion time of the user project. A report, including recommendations to improve these aspects/metrics, e.g., project success rate and project completion time, can be generated.

FIG. 1 illustrates a system 100 for analyzing a user project to identify opportunities in the optimization of input and output in the user project, according to embodiments of the disclosure. As shown in FIG. 1, system 100 may include one or more (e.g., N≥1) data sources 102-1, 102-2, . . . , and 102-N, cloud 104, and a terminal 106. A user 108 may send/upload to and receive/download data from system 100 through terminal 106.

Data sources 102-1, . . . , 102-N may include work-tracking software and/or software repositories. In some embodiments, each data source 102-1, . . . , 102-N includes work-tracking data such as various projects and any data associated with the projects. In the present disclosure, any data associated with a project can be referred to as project data, which can include programs and text data. The text data may include any suitable data other than the programs. For example, the text data may include, e.g., text of a project, an epic, an issue, etc.; a ticket; a subject; a description; an author (or creator); and/or dates and times when a subject is opened and closed. The text data may also include a description, an author (or creator), and/or dates and times of any reposts/replies to a project, an epic, an issue, and/or a ticket. In some embodiments, the text data includes natural language data, e.g., description and conversation between/amongst any users, in the project data. In some embodiments, data sources 102-1, . . . , 102-N include open source software and/or private software such as Github, JIRA, Microsoft Project, and/or Slack. Data sources 102-1, . . . , 102-N may be in the form of a virtual computer, a server, a network/web service, or the like, that is hosted by one or more private computer device(s) and/or cloud computing service provider(s). From the point of view of an outside observer (e.g., another network device connected to the Internet), data sources 102-1, . . . , 102-N may be perceived (e.g., through network interactions) as ordinary network devices (e.g., web servers) that exhibit normal behaviors commensurate with such kind of devices. In various embodiments, data sources 102-1, . . . , 102-N may be distributed in multiple geographical regions.

Cloud 104 (also referred to as network cloud 104) may be connected to data sources 102-1, . . . , 102-N, and configured to collect/receive data from data sources 102-1, . . . , 102-N. Cloud 104 may include a public and/or private network that can provide routes/paths of access between two entities connected to cloud 104. Cloud 104 may include a stand-alone server (or a suitable computer) or multiple servers/computers connected through a network (e.g., the Internet). The server(s)/computer(s) are collectively referred to as server 110. In some embodiments, server 110 may include a plurality of Application Programming Interface (API) servers to receive inquiries from terminal 106 and access data from data sources 102-1, . . . , 102-N.

Terminal 106 may act an user interface through which user 108 can upload/send data and obtain results. Terminal 106 may include a stand-alone computer or multiple computers connected through a network (e.g., the Internet). Computer(s) included in terminal 106 are collectively referred to as computer 112. Bi-directional data transmission may be established between user 108 and terminal 106, and between terminal 106 and cloud 104 through the Internet. As shown in FIG. 1, user 108 may access data stored in data sources 102-1, . . . , 102-N through API(s). User 108 may include an individual, an organization, or a group of organizations having computers, devices, or machines that are connected through a network.

Figure 2:
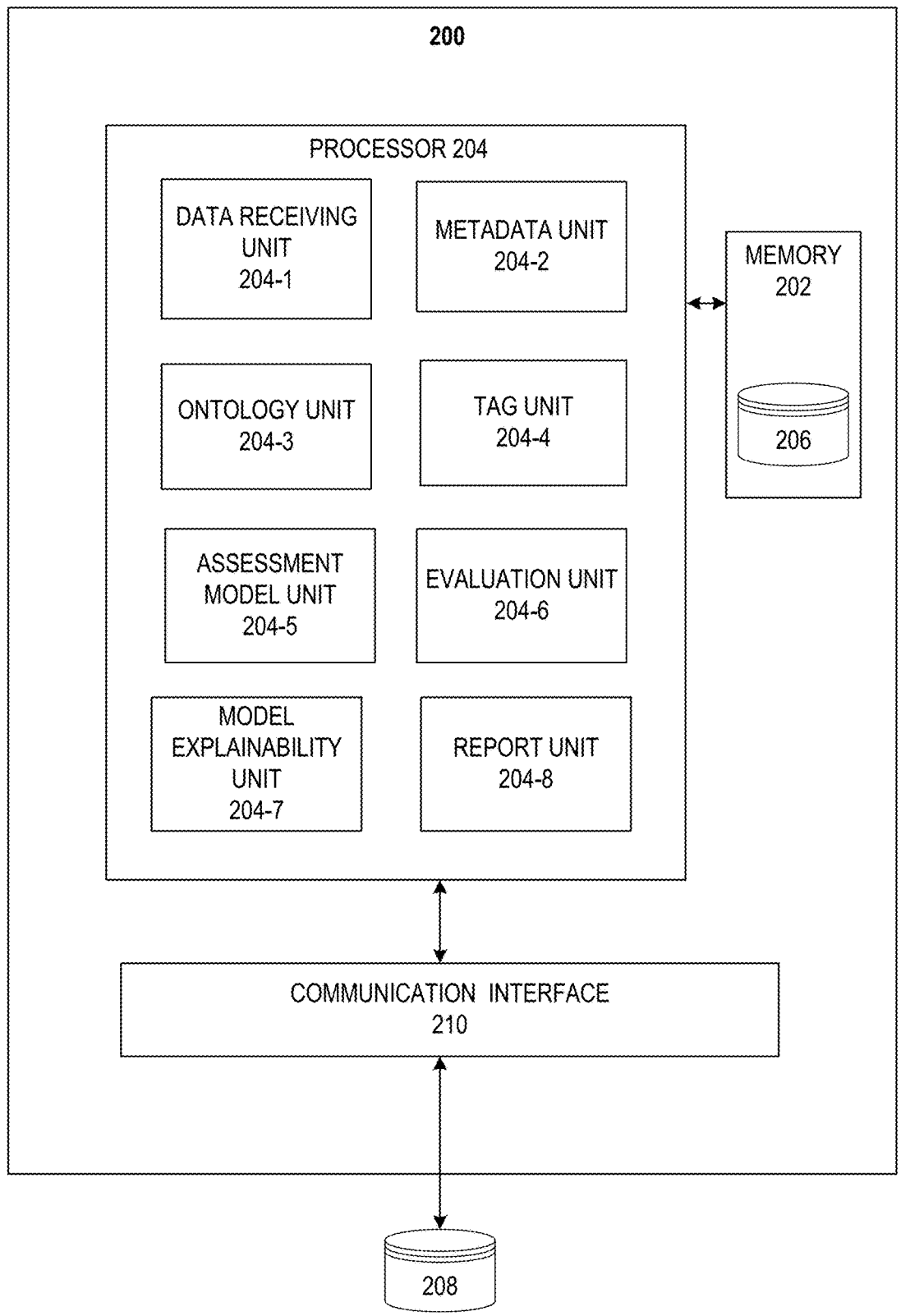
FIG. 2 illustrates an exemplary computer system that can be configured to implement various functions relating to user project analyses, according to embodiments of the present disclosure.

FIG. 2 illustrates an exemplary computer system 200, according to some embodiments. Computer system 200 may represent one or more servers 110 in cloud 104 and/or computer(s) 112 in terminal 106 and may be configured to execute functions, methods, and processes provided in the present disclosure. For example, a method for analyzing user projects, as will be discussed in greater detail in connection with FIGS. 4A and 4B, can be performed by cloud 104 and/or terminal 106 (e.g., using server(s) 110 and/or computer(s) 112). Similarly, methods shown in FIGS. 5A and 5B can also be performed by cloud 104 and/or terminal 106. FIGS. 6A-6E each illustrates certain features of system 100 and/or computer system 200, according to some embodiments. For ease of illustration, FIGS. 6A-6E are described together with FIG. 2. It should be noted that the examples shown in FIGS. 6A-6E are exemplary and for illustration purposes only. Data form and/or correlation amongst the features may vary in different embodiments.

Figure 3:
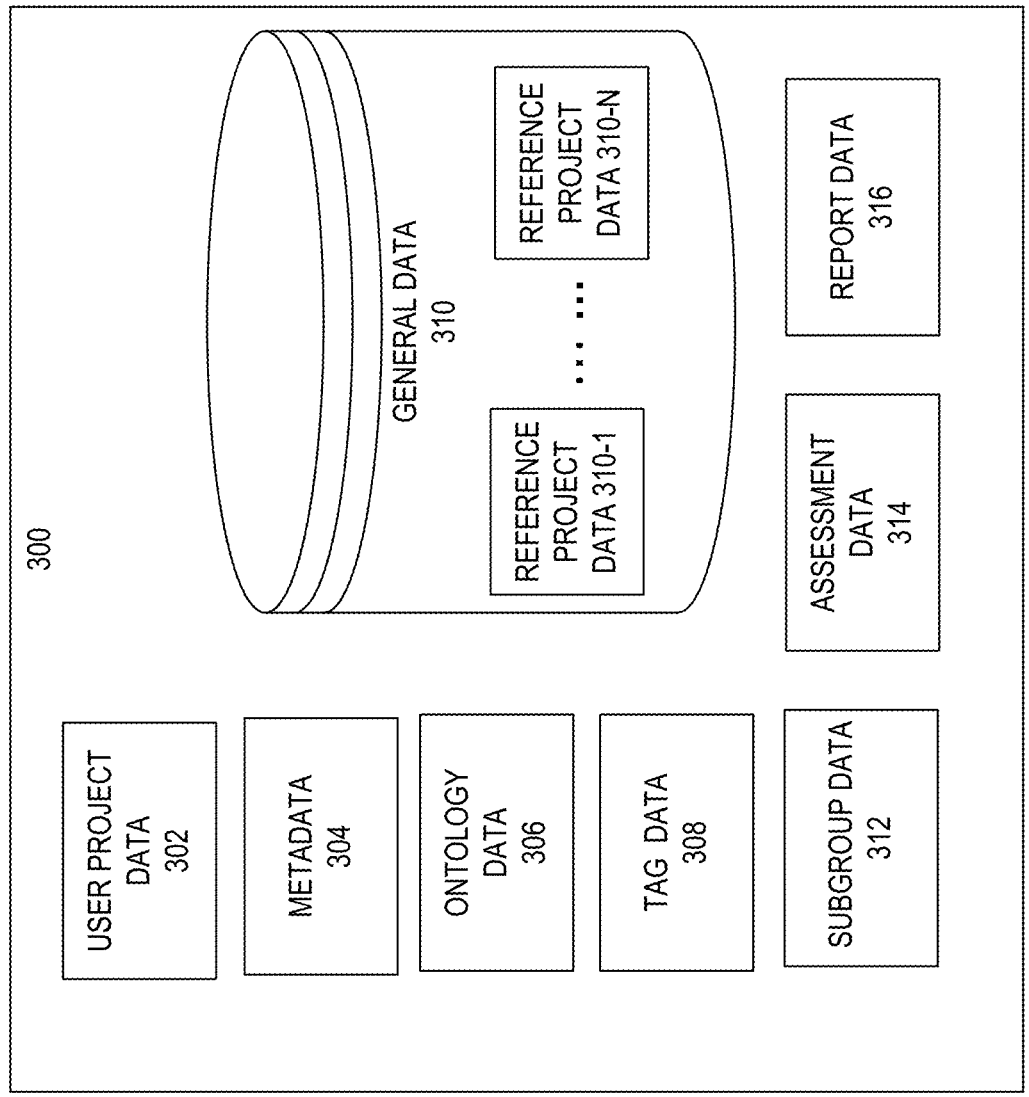
FIG. 3 illustrates an exemplary database, according to embodiments of the present disclosure.

As shown in FIG. 2, computer system 200 may include a processor 204 operatively coupled to a communication interface 210 and a memory 202. Computer system 200 may also include or connect to one or more databases, such as a database 206 as part of memory 202 and/or database 208 that is a stand-alone database. Database 208 may be operatively connected to processor 204 through communication interface 210. Databases 206 and 208 may be collectively referred to as a database system that may form part of system 100 or communicatively connected with system 100. FIG. 3 illustrates an exemplary database 300 that can implement database 208 and/or 206. In some embodiments, data transmission between processor 204 and memory 202, between processor 204 and communication interface 210, and between communication interface 210 and database 208 is each bi-directional.

Memory 202 may be any suitable volatile or non-volatile, magnetic, semiconductor-based, tape-based, optical, removable, non-removable, or other types of storage device or tangible (i.e., non-transitory) computer-readable medium including, but not limited to, a read-only memory (ROM), a flash memory, a dynamic random-access memory (RAM), and a static RAM. Data stored in memory 202 may include programming instructions, data for computation, backup data, operation logs, firmware, etc. For example, memory 202 may store programs that may be executed by processor 204 to perform the methods of the present disclosure.

Communication interface 210 may include any suitable software, middleware, firmware, and/or hardware that are configured to establish communication links between computer system 200 and other components of system 100. For example, communication interface 210 may include wired connection devices such as an Ethernet adapter, a modem, a coaxial cable adaptor, a fiber optical adapter, or the like. In another example, communication interface 210 may include wireless connection devices such as a wireless LAN adapter, a telecommunication modem, a satellite communication modem, a short-range communication adapter for establish short-range wireless connections such as Bluetooth, Zigbee, and/or Z-Wave connections.

Processor 204 may include any suitable processing devices such as a microprocessor, a central processing unit (CPU), a graphics processing unit (GPU), and the like. Processor 204 may be implemented in a centralized or distributed manner, depending on particular applications. As shown in FIG. 2, processor 204 may include multiple functional modules, such as a data receiving unit 204-1, a metadata unit 204-2, an ontology unit 204-3, a tag unit 204-4, an assessment model unit 204-5, an evaluation unit 204-6, a model explainability unit 204-7, and a report unit 204-8. It is noted that one or more of these functional modules/units/services may be omitted, depending on needs of applications.

Processor 204 may employ data receiving unit 204-1 to receive data from data sources 102-1, . . . , 102-N through communication interface 210. In some embodiments, data receiving unit 204-1 receives data of a plurality of projects from one or more of data sources 102-1, . . . , 102-N. For ease of description, projects received from data sources 102-1, . . . , 102-N are referred to as reference projects, and the set of data associated with a reference project may be referred to as a set of reference project data, which can include a reference project and work-tracking data of the reference project from multiple teams. The overall contribution of each team may be represented by an epic, which can include one or more issues (also referred to as "stories" or "tasks"), each issue representing the contribution of one user (team member). An issue can include one or more tickets, each ticket representing a specific problem/topic posted by a user. In some embodiments, each ticket can include one or more reposts, which include the replies to the ticket. The reference project data may include any programs and text data that can be used to track and/or evaluate the reference project. After receiving the reference project data, data receiving unit 204-1 may store the reference project data in database 206 and/or 208. The reference project data of all reference projects may collectively be referred to as general data 310 (FIG. 3). As shown in FIG. 3, a plurality of sets of reference project data 310-1, . . . , 310-N may be stored in database 300 and be collectively referred to as general data 310. That is, general data 310 is associated with the reference projects.

Data receiving unit 204-1 may also be configured to receive a user project having a set of user project data from a user (e.g., 108) through communication interface 210. That is, the user project data is associated with the user project. Similar to reference project data, user project data may include a user project, one or more epics, one or more issues, and one or more tickets. In some embodiments, user project data includes any programs and text data that can be used to track and/or evaluate the user project. After receiving the user project data, data receiving unit 204-1 may store the user project data in database 206 and/or 208. In some embodiments, the user project data and the general data are stored in the same database. As shown in FIG. 3, user project data 302 may be stored in database 300. In some embodiments, general data 310 and user project data 302 each includes raw data, which is downloaded without any data processing by processor 204.

FIG. 6A illustrates an example of a set of raw data that can represent a set of reference project data and/or a set of user project data. As shown in FIG. 6A, the raw data can include various data associated with the project, such as an issue number with the uniform resource locator (URL) link to the issue number (602-1), labels and comments with respective URL links (602-2), title of the issue and the user that created the issue (602-3), the state of the issue (602-4), and dates the issue was created, updated, and closed (602-5).

Processor 204 may employ metadata unit 204-2 to determine the metadata from user project data 302 and general data 310. In the present disclosure, metadata refers to any data derived from the raw data and provides information about the user project and/or the reference projects. For each of user project data 302 and general data 310 (e.g., raw data), metadata unit 204-2 may determine and extract the respective metadata, and store the respective metadata in database 300. In some embodiments, a portion of the metadata is associated with the user project. In some embodiments, another portion of the metadata is associated with the reference projects. As shown in FIG. 3, the metadata associated with the user project and reference projects are collectively referred to as metadata 304. The metadata associated with user project and reference projects can each be stored in the format of a respective key-value store. For example, the key includes the project name and the values include metadata (e.g., number of open tickets, average ticket execution times, ticket description, ticket body, number of comments in ticket, etc.)

Figure 6B:
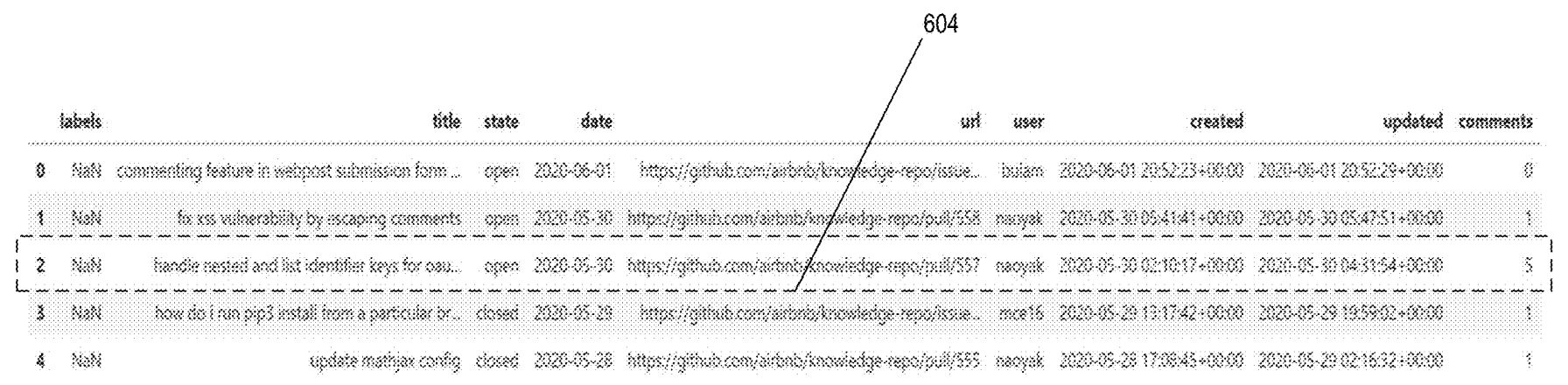

FIG. 6B illustrates an example of a set of metadata derived from a respective set of raw data, such as the raw data shown in FIG. 6A. The set of metadata can represent an example of metadata derived/extracted from the reference project data and/or user project data. The metadata may be extracted from a plurality of issues. As shown in FIG. 6B, the metadata may be stored in a columnar database form, in which each column (e.g., column 604) may represent the same type of metadata (e.g., labels, title, state, data, URL, user, created, updated, number of comments, etc.) of various issues and each row may represent the various type of metadata associated with the same issue. The metadata may be obtained by extracting relevant information from the raw data. For example, metadata can be generated by, e.g., removing certain text and/or symbols from a term or sentence, processing (e.g., computing) the raw data to derive processed data, etc. In some embodiments, metadata facilitates information included in the raw data to be more easily processed than the raw data, e.g., to be more easily processed by assessment model unit 204-5.

Figure 6C:
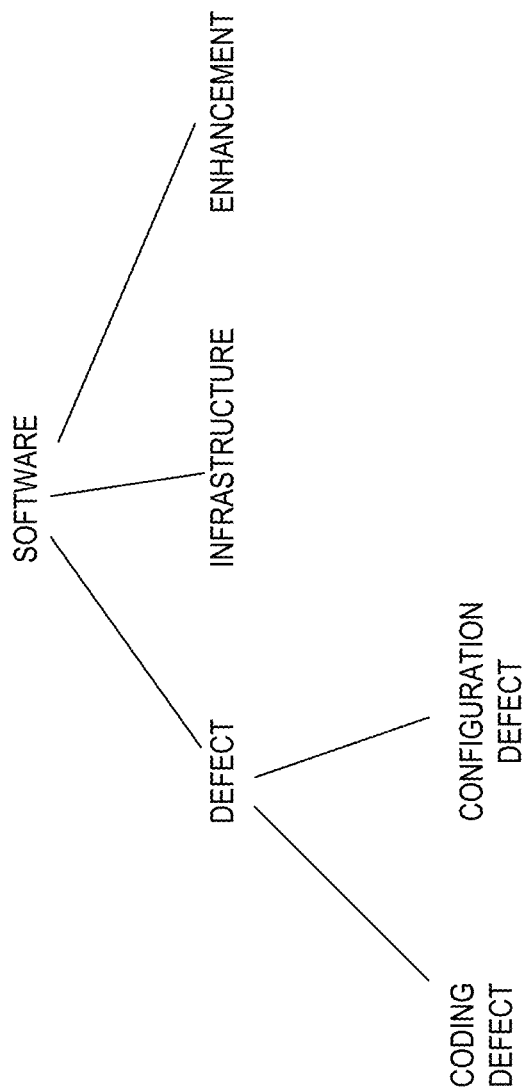

Processor 204 may employ ontology unit 204-3 to determine an ontology of user project data 302 and general data 310. In some embodiments, the ontology represents interrelations between data of the user project (e.g., user project data 302) and the reference projects (e.g., general data 310) under a framework of categories. In some embodiments, the ontology is stored in the format of a key-value store in ontology data 306 in database 300 after being generated. The ontology may reflect various categories, types, and/or properties to divide, classify, and/or characterize user project data 302 and general data 310, and represent the interrelationships between the words/texts in user project data 302 and those in general data 310. FIG. 6C illustrates an example of an ontology that represents interrelationships amongst various terms in user project data 302 and general data 310. As an example, "software" is related to "defect," "infrastructure," and "enhancement," while "defect" is related to "coding defect" and "configuration defect."

To generate the ontology, processor 204 may employ ontology unit 204-3 to determine a numerical representation of the text data in general data 310. In some embodiments, ontology unit 204-3 converts the text data in general data 310 and user project data 302 into numerical representations, e.g., embeddings according to which each word/text in the text data may correspond to a vector. Word embedding is the collective name for a set of language modeling and feature learning techniques in NLP where words or phrases from the vocabulary are mapped to vectors of real numbers.

Processor 204 may also employ ontology unit 204-3 to determine at least one natural language processing (NLP) model using at least one of the metadata associated with the user project, the metadata associated with the reference projects, and the numerical representation of the text data. Depending on the NLP model and/or algorithm, any or all of the metadata associated with the user project, the metadata associated with the reference projects, and the numerical representation of the text data can be used as inputs. For example, the at least one NLP model may include any suitable supervised NLP machine learning algorithms (e.g., programs) such as Support Vector Machines, Bayesian Networks, Tree-based methods (Random Forest, XGBoost), and/or Neural Networks/Deep Learning. In some embodiments, a single NLP model is determined. In some embodiments, parameters, programs, and/or data associated with the NLP model(s) can be stored in ontology data 306.

Processor 204 may employ tag unit 204-4 to determine one or more tags associated with user project data 302 using the ontology. To determine the tags, tag unit 204-4 may determine the framework of categories, each category being employed to categorize a text in user project data 302 and/or general data 310, based on the ontology. The framework of categories may then include a hierarchy of categories for words/terms/objects in user project data 302 and/or general data 310. In some embodiments, the categories are associated with (e.g., tagged to) project data (e.g., user project data 302 and/or general data 310) based on the ontology. In some embodiments, each category is associated with or referred to as a tag. Tag unit 204-4 may then associate user project data 302 (e.g., tag user project data 302) with one or more tags (i.e., categories), which may be a subset of all the tags associated with the framework of categories. Referring back to the example in FIG. 6C, a ticket in the user project may be in a category "coding defect" (e.g., corresponding to tag 1), which is a sub-category of category "defect" (e.g., corresponding to tag 2). Category "defect" may in turn be a sub-category of category "software" (e.g., corresponding to tag 3). The tags associated with user project data 302 can thus include tags 1, 2, and 3. In some embodiments, tag unit 204-4 tags user project data 302 based on the text data in user project data 302, e.g., text data in each issue. In some embodiments, the tags associated with user project data 302 may include tags associated with all the issues in the user project. For example, only text data in user project data 302 is tagged such that the tags/categories associated with the user project are represented by the tags associated with the text data. In some embodiments, depending on the text contained in the tickets, issues, and/or epics, each set of user project data 302 can be tagged with a plurality of tags. In some embodiments, tag unit 204-4 also determines tags associated with each set of reference project data 310-1, ..., 310-N based on the ontology. Tag unit 204-4 may store tags and/or categories associated with user project data 302 and general data 310 in tag data 308 in database 300.

Processor 204 may employ assessment model unit 204-5 to determine a subgroup of reference projects from general data 310 based on the tags associated with user project data 302 and tags associated with reference project data 310-1, ..., 310-N. The reference projects in the subgroup may be referred to as relevant reference projects. To determine the relevant reference projects, assessment model unit 204-5 may determine a level of relevance for each reference project in general data 310. In some embodiments, the level of relevance of a reference project is defined as the number of tags shared by the reference project and the user project divided by the total number of tags associated with the user project. In some embodiments, for a reference project to be selected into the subgroup as a relevant reference project, the level of relevance may be sufficiently high, for example, exceeding a threshold. In some embodiments, the level of relevance may be represented by a percentile and the threshold can be set to be at least 60% (e.g., 60%, 70%, 80%, 90%, 100%). In some other embodiments, the level of relevance of a reference project is defined as the number of tags shared by the reference project and the user project. In some embodiments, for a reference project to be selected into the subgroup as a relevant reference project, the level of relevance may be sufficiently high, for example, exceeding a threshold, which can be set to be a pre-determined threshold number, e.g., 25, 50, 75, etc. In some embodiments, a plurality of relevant reference projects are selected into the subgroup based on their respective levels of relevance. The plurality of relevant reference projects can be stored in subgroup data 312. In some embodiments, subgroup data 312 includes a plurality of relevant reference projects each having the same set of tags as the user project (e.g., each having a relevance level of 100%).

Processor 204 may employ assessment model unit 204-5 to generate one or more assessment models based on the subgroup of relevant reference projects. Each assessment model may provide an assessment of one aspect of the relevant reference projects. The assessment models can subsequently be employed to predict/assess various aspects of the user project. The inputs of each assessment model may be a subset of the metadata associated with all relevant reference projects. In some embodiments, the inputs may include training data that are used to train the assessment models. The training data may include, for example, one or more types of metadata associated with the relevant reference projects and at least one metric (e.g., a target) of the relevant reference projects. In some embodiments, testing data may also be used to evaluate the assessment models. In some embodiments, the training data and the testing data may each be a respective (e.g., non-overlapping) portion of the subset of metadata. For example, the training data may represent a larger portion (e.g., 70%, 80%, 90%, etc.) of the subset of metadata and the testing data may represent a smaller portion (e.g., 30%, 20%, 10%, etc.) of the subset of metadata. In some embodiments, one or more assessment models may be trained by the training data using, for example, a regression method, a tree-based method, a neural network, etc. The one or more assessment models may include a function between the one or more types of metadata in the training data and the at least one metric, for example, quantifying the likelihood of yielding the at least one metric based on the one or more types of metadata using a set of parameters. Processor 204 may determine the parameters by training the one or more assessment models using the training data.

As a part of the model building process, processor 204 may employ assessment model unit 204-5 to determine the input(s) and output of each assessment model. For example, assessment model unit 204-5 may determine the input(s) based on whether the metadata selected as the input may improve the metric prediction ability of the assessment model, e.g., the test set metrics. In some embodiments, the input of an assessment model includes the name of a user that opened an issue, a number of comments in a project/epic/issue/ticket, a number of people contributing to a project/epic/issue/ticket, percentage of open/closed tickets, a number of tickets closed per period of time, a capacity of the users contributing to the project/epic/issue/ticket, a number of data sources a project/epic/issue/ticket is logged in, a length of the description of the ticket, an expected time for ticket/issue/epic completion, and/or an average time of ticket/issue/epic completion. In some embodiments, the input(s) of one assessment model can be the same as or different from that of another assessment model.

Assessment model unit 204-5 may determine the target to be a metric representing an respective aspect of the relevant reference projects. Examples of the target may include, time duration of a project, success rate of a project, etc. The target of an assessment model may be used to determine the algorithm used in the assessment model. In some embodiments, the algorithm in an assessment model includes regression methods, tree-based methods (e.g., using random forest algorithms), and/or neural networks. In some embodiments, each assessment model is trained, using the input(s) (e.g., training data) to obtain a function between the input(s) and the target. The function fits the parameters of the assessment models. The testing data is used to provide an unbiased evaluation of the function/assessment model trained by the training data. In some embodiments, a different algorithm/model/method is used to predict a different target. As shown in FIG. 3, the assessment models and related data, e.g., training data and testing data, can be stored in assessment data 314 in database 300.

Processor 204 may employ evaluation unit 204-6 to evaluate the user project using metadata associated with the user project and the assessment model(s). A plurality of assessment outcomes can be generated. The input(s) of each assessment model may be the same type of metric as the input(s) for training the assessment model. Each assessment outcome may be the same type of metric as the target of the respective assessment model. The assessment outcomes may be the same type of metric as the targets. The assessment outcomes may include the predicted success rate (e.g., probability of success) of the user project, the predicted completion duration of the user project, etc. As shown in FIG. 3, the input(s) and assessment outcomes of assessment models may be stored in assessment data 314 in database 300.

Figures 6D, 6E:
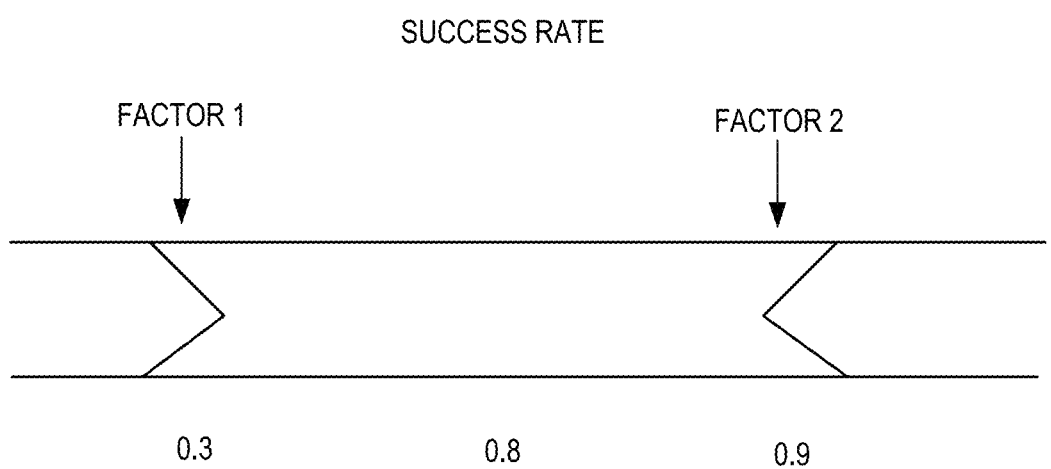

FIG. 6D illustrates exemplary evaluations of assessment models, and corresponding assessment outcomes. In some embodiments, different models/algorithms are used in the assessment model for assessing/predicting success rate of the user project and the average completion time of an issue. For example, model I employed in the assessment model for success rate is a Random Forest model/algorithm, and model II employed in the assessment model for average completion time of an issue is a Linear Regression model/algorithm. As an example, the predicted success rate of the user project is 0.7 (e.g., a fraction between 0 and 1), and the predicted average completion time of an issue is 15 days.

Processor 204 may employ model explainability unit 204-7 to obtain model explainability measures of each assessment model on the respective assessment outcome. Model explainability unit 204-7 may employ the explainability of each assessment model to evaluate corresponding aspects of the user project. The model explainability may provide reasons why the assessment outcome is generated. In some embodiments, the explainability of an assessment model includes the metadata that is determinant (or more important than other metadata) on the assessment outcome. Explainability can be achieved by computing the contribution of each input of the respective assessment model to the assessment outcome using methods like game theory. In some embodiments, to evaluate the user project, model explainability unit 204-7 determines a list of inputs that have a larger effect on respective assessment outcomes. As shown in FIG. 3, the explainability corresponding to each assessment model may be stored in assessment data 314 in database 300.

FIG. 6E illustrates an example of explainability based on a predicted assessment outcome shown in FIG. 6D. As an example, the predicted assessment outcome is the success rate 0.7. As shown in FIG. 6E, factor 1 may represent a factor that is predicted to increase the success rate, and factor 2 may represent a factor that is predicted to decrease the success rate. In some embodiments, factor 1 represents the number of users contributing to an issue, and factor 2 represents the number of words describing the issue. It can then be determined that a greater number of users contributing to an issue can increase the success rate of the user project, and a reduced number of words describing an issue can reduce the success rate of the user project.

Processor 204 may employ report unit 204-8 to generate a report to the user. The report may include recommendations determined based on the assessment outcomes and the respective explainability. For example, the report may include recommendations such as, to increase the success rate of the user project, increase the number of users contributing to an issue and/or increasing the number of words describing an issue. As shown in FIG. 3, the report may be stored in report data 316 in database 300.

Figure 4A:
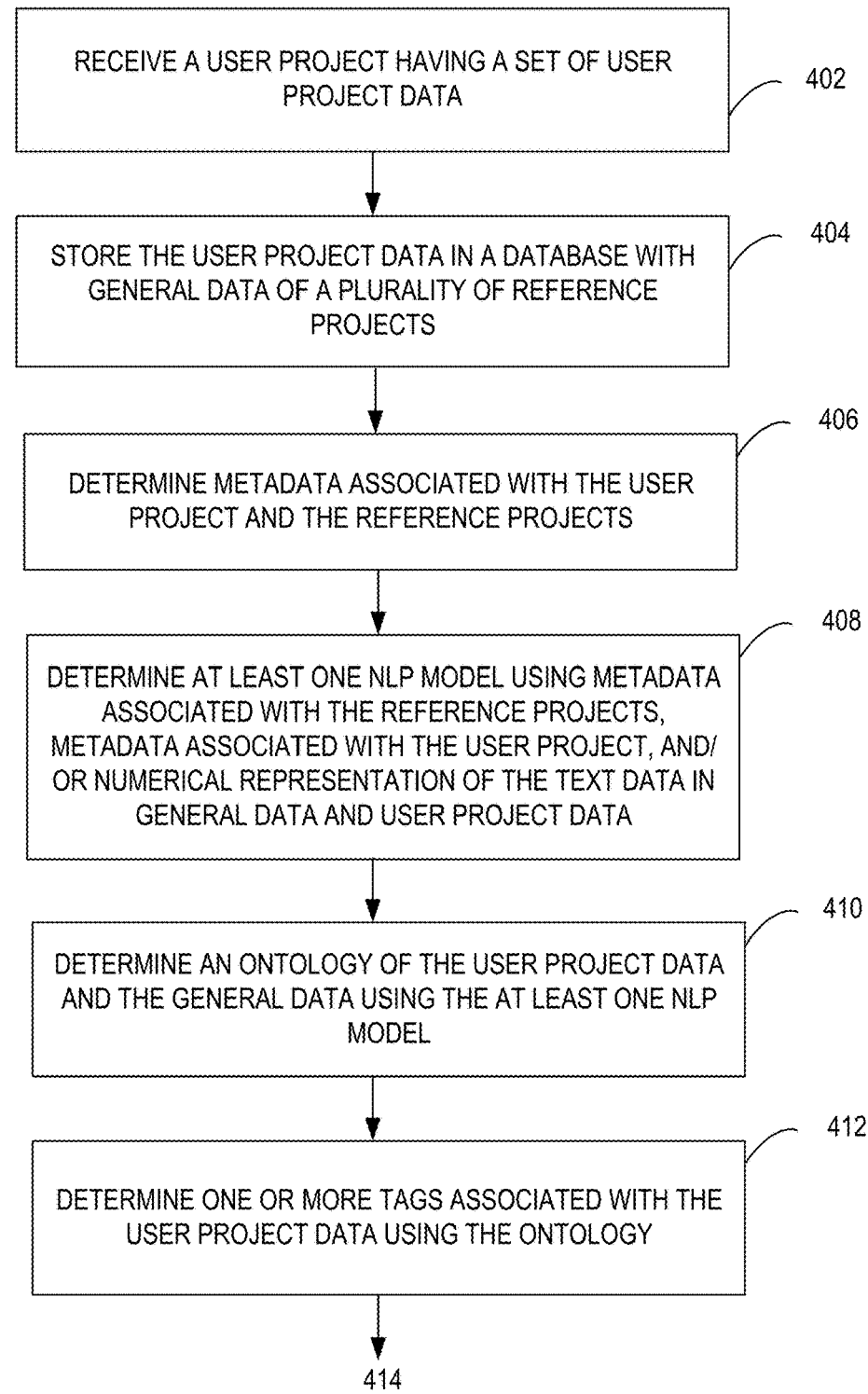
FIGS. 4A and 4B illustrate a flowchart of an exemplary method for analyzing user projects, according to embodiments of the disclosure.
Figure 4B:
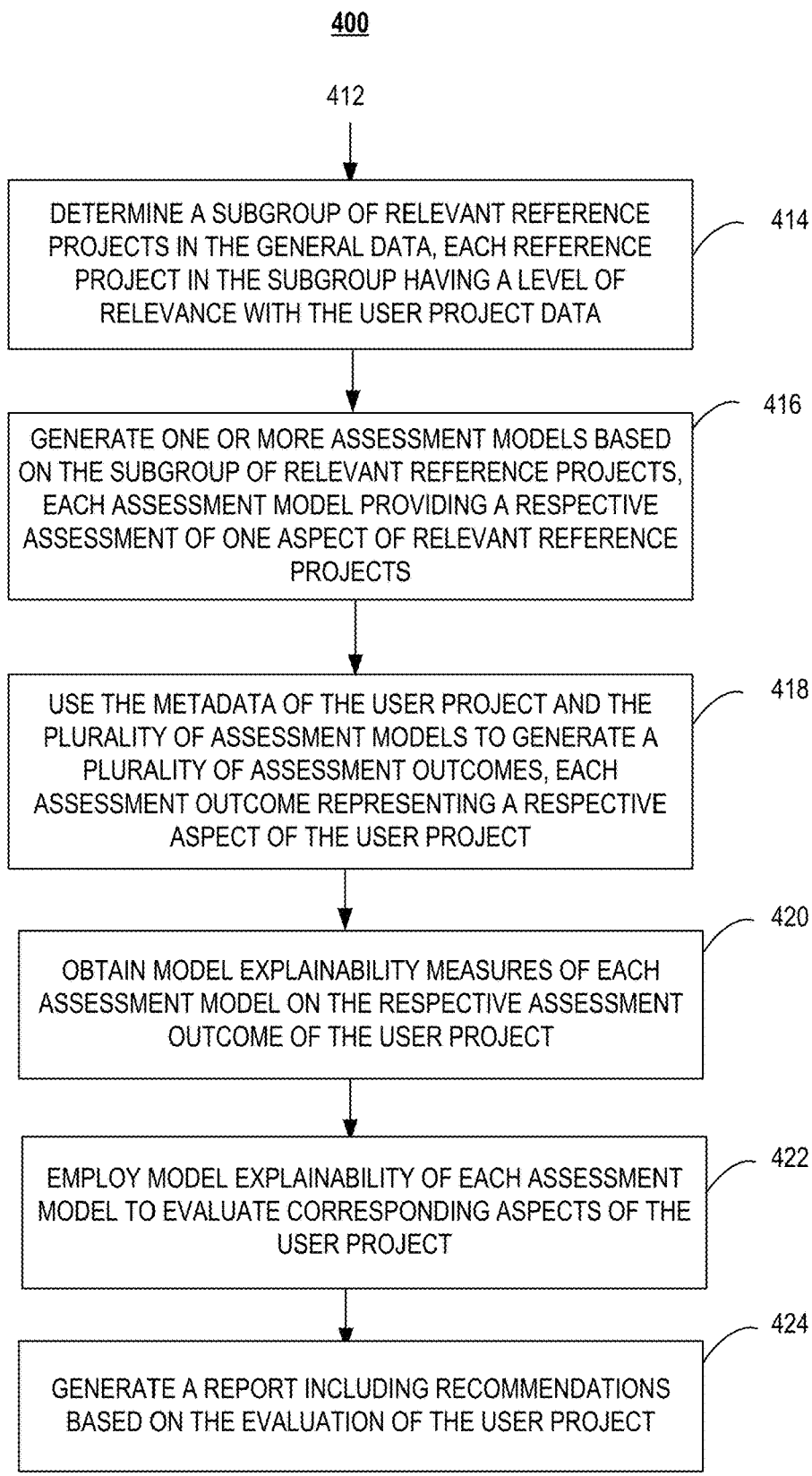

FIGS. 4A and 4B illustrate a flowchart of an exemplary method 400 for analyzing a user project to identify opportunities for optimization for team inputs and outputs, according to embodiments of the disclosure. FIG. 4B is a continuation of FIG. 4A. Method 400 may be performed by components of system 100, for example, the processor(s) in cloud 104 and/or the processor(s) in terminal 106. For ease of description, processor 204 is described to execute method 400. Method 400 may include several steps, some of which may be omitted. In addition, the steps may be performed in a different order than the one shown in FIGS. 4A and 4B. One or more steps may also be performed simultaneously.

In step 402, processor 204 may receive a user project having a set of user project data. A user (e.g., user 108) may submit the user project by uploading the user project onto system 100 through any suitable server. Processor 204 may also obtain the user project from any suitable software repository. Processor 204 may receive the user project through an interface of system 100. The user project data may include any data (e.g. raw data) associated with the user project. In some embodiments, the raw data includes programs (e.g., codes) and text data. The text data may include any suitable data other than the programs. For example, the text data may include, e.g., text of a project, an epic, an issue, and/or a ticket; a subject; a description; an author (or creator); and/or dates and times of subject open and closed. The text data may also include a description; an author (or creator); and/or dates and times of all the repost/replies to the project, an epic, an issue, and/or a ticket. In some embodiments, the text data includes natural language data, e.g., description and conversation between/amongst any users, in the user project data.

In step 404, processor 204 may store the user project data in a database, e.g., database 206 and/or 208. Processor 204 can also download general data from one or more data resources (such as any suitable software repositories, open source collaboration tools, and/or private collaboration tools) prior to, at the same time with, or after receiving the user project. For example, the data sources may include work-tracking software such as Github, JIRA, Slack, and Microsoft Project. In some embodiments, processor 204 downloads and stores the general data before receiving the user project and processes the general data to obtain any necessary data (e.g., metadata, as described as follows) for subsequent computation. In some embodiments, the general data is updated (e.g., downloaded) periodically, e.g., every 24 hours, every week, every month, etc., regardless of the receipt of a user project. In some embodiments, processor 204 downloads and stores the general data each time a new user project is received. The general data may thus include the latest updates, which can be used to improve the precision of the evaluation of the user project.

In some embodiments, user project data is stored with general data in the same database. It should be appreciated that, in various embodiments, user project data can also be stored in a different database from the general data. The specific storage location of the user project data and the general data should not be limited by the embodiments of the present disclosure. In some embodiments, the user project data and the general data are stored in the same database to improve computation efficiency.

In step 406, processor 204 may determine the metadata from the user project and the general data. In some embodiments, after receiving the user project data, processor 204 separates the non-metadata (e.g., programs) in the user project data and obtains the metadata, which can be stored in the format of a respective key-value store. Processor 204 may then extract the metadata associated with the user project (e.g., user project data). Processor 204 may also extract the metadata associated with the reference projects (e.g., general data) after downloading the general data. In various embodiments, processor 204 can determine the metadata associated with the general data prior to, at the same time with, or after the user project data is received, depending on the time the general data is downloaded. In some embodiments, the metadata associated with the general data is determined prior to the receipt of the user project, and is updated each time the general data is updated. In some embodiments, the general data is downloaded after the receipt of the user project, and the metadata associated with the general data is determined after the download of the general data. The metadata associated with the general data can be stored in the format of a respective key-value store. For example, the key includes the project name and the values include the associated metadata (number of open tickets, average ticket execution times, ticket description, ticket body, number of comments in ticket etc.) In some embodiments, the determined metadata associated with the user project and the reference projects is stored in the same database as the user project data and the general data.

In step 408, processor 204 may determine at least one NLP model using the metadata associated with the user project, the metadata associated with the reference projects, and/or the numerical representation of the text data in the general data and the user project data. As previously described, the metadata may include any data derived from the raw data (e.g., the user project data or the general data), e.g., for subsequent computation. For example, the raw data may include the open and closure times of a ticket, and the metadata may include the ticket execution time of the ticket, which can be calculated as the time difference between the open and duration times. In some embodiments, processor 204 converts the text data in the general data and the user project data into numerical representations, e.g., embeddings, and then determines a suitable NLP model(s) based on the metadata and the numerical representations. For example, the NLP models may include any suitable supervised and unsupervised NLP machine learning algorithms (e.g., programs) such as Latent Dirichlet Allocation, Support Vector Machines, Bayesian Networks, Tree-based methods (Random Forest, XGBoost), and/or Neural Networks/Deep Learning. In some embodiments, a single NLP model is determined.

In step 410, processor 204 may determine an ontology of the user project data and the general data using the NLP model(s). The ontology may reflect various categories, types, and/or properties to divide, classify, and/or characterize the user project data and the general data, and represent the interrelationships amongst the words/texts in the user project data and the general data. In some embodiments, the ontology represents interrelations between the user project and the plurality of reference projects under a framework of categories. In some embodiments, the ontology is stored in the format of a key-value store.

In step 412, processor 204 may determine one or more tags associated with the user project data using the ontology. To determine the tags associated with the user project data, processor 204 may first determine the framework of categories, each being employed to categorize, divide, classify, and/or characterize text in the user project data and the general data (e.g., issues in the user project data and the general data), based on the ontology. In some embodiments, each category is associated with or referred to as a tag. Processor 204 may then associate user project data with (e.g., tag user project data) one or more tags (i.e., categories), which may be a subset of all the tags associated with the framework of category. In some embodiments, processor 204 tags the user project data based on the text data in the user project data. For example, only text data in user project data is tagged such that the tags/categories associated with the user project are represented by the tags associated with the text data. In some embodiments, depending on the text contained in the tickets, issues and/or epics, each user project data can be tagged with a plurality of tags. In some embodiments, processor 204 also tags the text data of the general data, e.g., using similar methods, based on the ontology such that each reference project is associated with one or more tags.

In step 414, processor 204 may, using the tags associated with user project data, determine a plurality of reference projects in the general data that are relevant to the user project. The plurality of reference projects may be a subgroup of all the reference projects in the general data and may be referred to as relevant reference projects. To determine the relevant reference projects, processor 204 may first define a level of relevance of a set of reference project data to be the number of shared tags/categories (e.g., identical tags/categories shared by/matching the user project data and a set of reference project data) between the user project data and the set of reference project data. In some embodiments, the level of relevance of the set of reference project data is represented by a percentile, being equal to the number of shared tags/categories divided by the total number of tags/categories associated with the user project data. Each reference project in the general data may be associated with a relevance level. Processor 204 may also determine a threshold of the level of relevance to filter out less relevant reference projects (e.g., reference projects with levels of relevance lower than the threshold). The threshold of level of relevance may be a sufficiently high number. In some embodiments, the threshold of level of relevance is represented by a percentile and is set to be at least 60% (e.g., 60%, 70%, 80%, 90%, 100%). In some embodiments, the threshold of level of relevance is represented by a threshold number of tags, e.g., 25, 50, 75, etc. For a reference project to be selected into the subgroup, the level of relevance of the reference project may be sufficiently high, e.g., higher than the threshold(s). In some embodiments, a plurality of relevant reference projects are selected into the subgroup, when their levels of relevance exceeding or equal to the threshold. Reference projects having levels of reference lower than the threshold may not be selected into the subgroup. In some embodiments, at least one (e.g., each) relevant reference project shares identical tags/categories (e.g., the subset of categories) with the user project and has a relevance level of 100%.

Figure 5A:
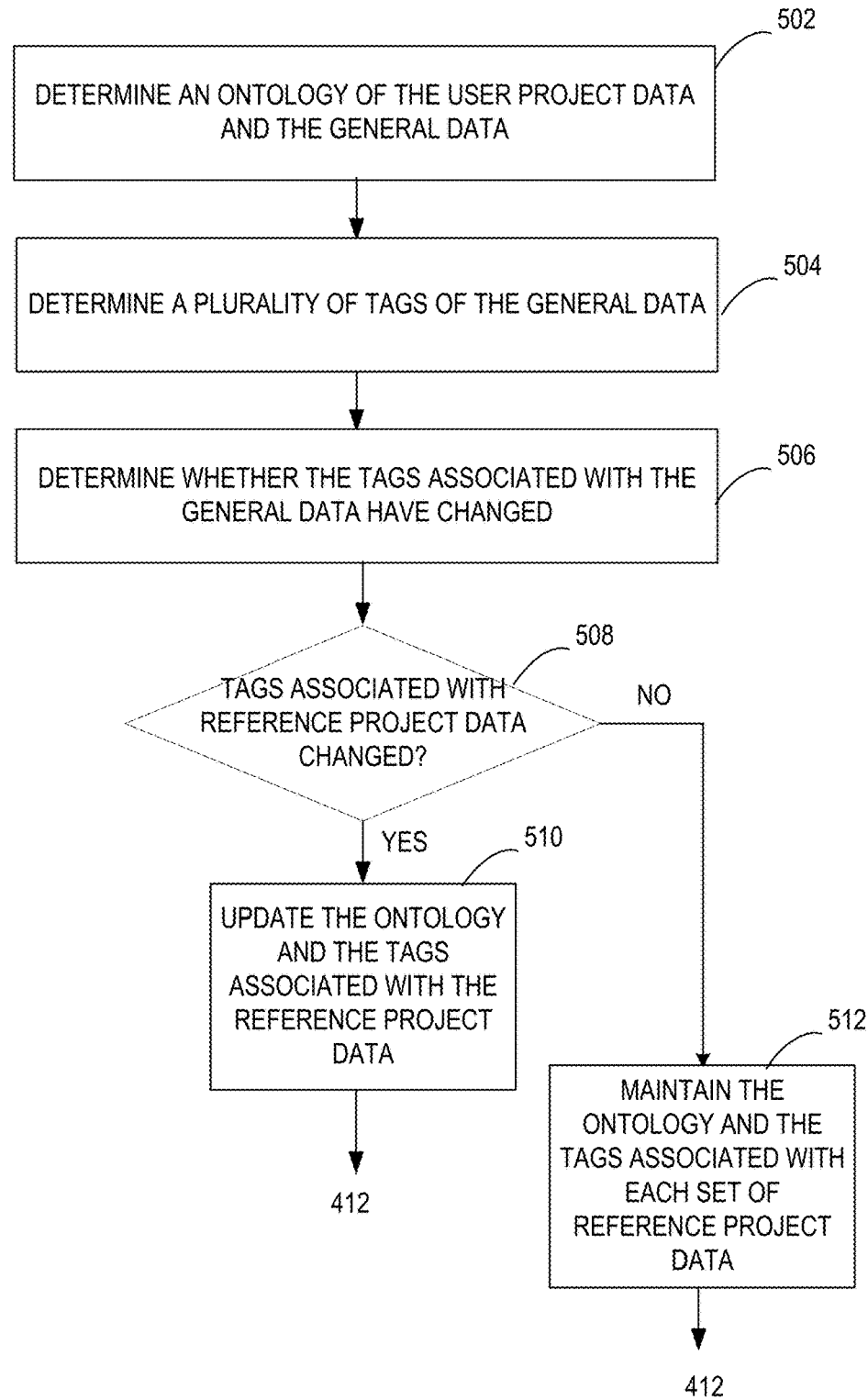
FIG. 5A illustrates a flowchart of an exemplary method for updating tags in a database, according to embodiments of the disclosure.
Figure 5B:
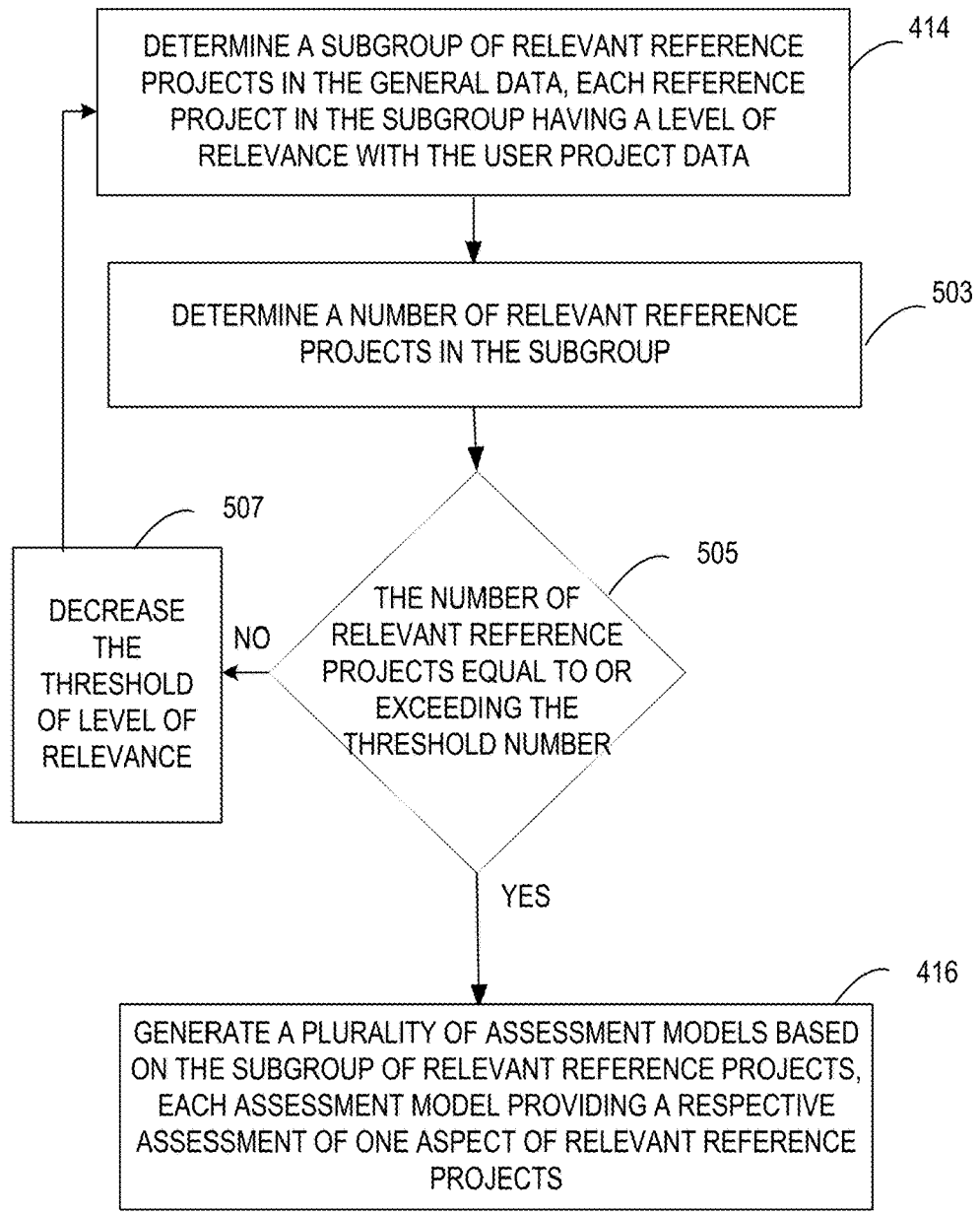
FIG. 5B illustrates a flowchart of an exemplary method for selecting relevant reference projects, according to embodiments of the disclosure.

In some embodiments, method 501, as shown in FIG. 5B, is performed to ensure a sufficient number of relevant reference projects are selected to improve the precision of the assessment models. In some embodiments, before proceeding to step 416, processor 204 may proceed to step 503, in which processor 204 determines the number of relevant reference projects in the subgroup. Processor 204 may determine, in step 505, whether the number of relevant reference projects in the subgroup is equal to or exceeding a threshold number of relevant reference projects. If yes, processor 204 may proceed to step 416. If no, processor 204 may proceed to step 507, in which processor 204 may decrease the threshold of level of relevance. Processor 204 may proceed to step 414 to select another subgroup of relevant reference projects. Processor 204 may continue the loop process until the number of relevant reference projects is equal to or exceeding the threshold number. The loop process may ensure a sufficient number of relevant reference projects can be selected for building the assessment models in the subsequent step. In some embodiments, the threshold number is any suitable number such as 100, 500, 1000, etc.

In step 416, processor 204 may generate one or more assessment model(s) based on the plurality (e.g., subgroup) of relevant reference projects. Each assessment model may be a training model that provides an assessment of one aspect of the relevant reference projects. Processor 204 may determine the inputs of each assessment model to be a subset of the metadata associated with all relevant reference projects. In some embodiments, processor 204 may determine the metadata selected as the inputs to improve the prediction of the assessment model. In some embodiments, the inputs may include training data that are used to train the assessment models. The training data may include, for example, one or more types of metadata associated with the relevant reference projects and at least one metric (e.g., a target) of the relevant reference projects. In some embodiments, processor 204 employs testing data to evaluate the assessment models. The output of each assessment model may be referred to as a target, which is a metric representing an aspect of the relevant reference projects. Processor 204 may employ the target of an assessment model to determine the algorithm used in the assessment model (or training). In some embodiments, the training data and the testing data may each be a respective (e.g., non-overlapping) portion of the subset of metadata. For example, the training data may represent a larger portion (e.g., 70%, 80%, 90%, etc.) of the subset of metadata and the testing data may represent a smaller portion (e.g., 30%, 20%, 10%, etc.) of the subset of metadata. In some embodiments, the algorithm in an assessment model includes regression, tree-based methods (random forest), and/or neural networks. In some embodiments, each assessment model is trained, using the inputs (e.g., training data) to the target. The one or more assessment models may include a function between the one or more types of metadata in the training data and the at least one metric, for example, quantifying the likelihood of yielding the at least one metric based on the one or more types of metadata using a set of parameters In step 418, processor 204 may employ at least a portion of the metadata associated with the user project data as the input(s) into the plurality of assessment models to generate a plurality of assessment outcomes. Each assessment outcome may represent an aspect of the user project. In this step, the inputs of each assessment model include at least a portion of the metadata associated with the user project data and are the same types of metric as the training data (e.g., the metadata associated with the relevant reference projects) used in step 416. The assessment outcome may be the same type of metric of target, in step 416, reflecting the respective aspect of the user project. The assessment outcome may represent the predicted success rate (e.g., probability of success) of the user project, the predicted completion duration of the user project, etc.

In step 420, processor 204 may obtain model explainability measures of each assessment model on the respective assessment outcome of the user project. The model explainability may provide reasons why the assessment outcome is generated. In some embodiments, the explainability of an assessment model includes the metadata that is determinant on the assessment outcome. In some embodiments, a suitable algorithm/method/software package, e.g., SHAPLEY, may be used to obtain the explainability of an assessment model. The explainability step may assign a measure of importance of each input from the user project data to the assessment outcome. The most important inputs may be used to determine recommendations in subsequent steps. In an example, if input "a number of users contributing to a ticket" has a large effect (e.g., a larger effect than other inputs) on reducing assessment outcome "a success rate", then a recommendation may include reducing the number of users (e.g., developers) assigned to a ticket.

In step 422, processor 204 may employ model explainability of each assessment model to evaluate corresponding aspects of the user project. For example, from the assessment outcomes, a list of inputs that have a large effect on the assessment outcomes can be used to generate recommendations. Processor 204 may extract the list of inputs (e.g., important/significant inputs) and perturb the inputs until the appropriate model response is achieved. The input and its value will form the basis of the recommendations. For example, if input "the number of users" has a large effect on the assessment outcome, then the value will be modified until the assessment model predicts a sufficiently high success rate. It will then be recommended that "the number of users" to increase success is X, which is the modified value of "the number of users" that has a high success rate.

In step 424, processor 204 may generate a report that includes recommendations based on the evaluation of the user project data with the assessment models. In some embodiments, the report includes the predicted success rate of the user project, the predicted duration time of the user project, the predicted most common tickets/issues, the predicted most common types of programming defects, and/or recommendations to increase the success rate of the user project. Recommendations are generated from step 422 in which important inputs and how they affect assessment outcomes are determined. The explainability of the user project, as described in step 422, can be incorporated into the recommendations to show the factors that have a significant impact on the assessment outcomes, e.g., factors that can increase/decrease success rate. In various embodiments, the user project data can be incorporated as part of the general data after the assessment, e.g., as a reference project.

In some embodiments, in method 400, the general data is tagged each time after it has been downloaded and the user project is tagged based on the ontology determined based on the general data. For example, an ontology may be determined (e.g., using similar methods as described in steps 408 and 410) to reflect the interrelationships amongst the reference projects in the general data, and each reference project may be tagged based on the ontology. In some embodiments, no ontology is formed between the user project data and the general data, and the user project is tagged (e.g., in step 412) based on pre-determined ontology associated with the general data.

In some embodiments, the ontology of the general data is predetermined and updated periodically. For example, instead of generating/updating the ontology each time a user project is received, the ontology may be updated periodically, e.g., every day, every week, or every month, to reflect the interrelationships amongst the general data before the update and any user project data received during the period. The ontology can thus be stored for tagging the user project data in the subsequent period.

FIG. 5A illustrate a flowchart of an exemplary method 500 for updating the ontology and/or tags in the general data, according to embodiments of the disclosure. Method 500 may be performed by components of system 100, for example, the processor(s) in cloud 104 and/or the processor(s) in terminal 106. For ease of description, processor 204 is described to execute method 500. Method 500 may include several steps, some of which may be omitted. In addition, the steps may be performed in a different order than the one shown in FIG. 5A. One or more steps may also be performed simultaneously.

In step 502, processor 204 may employ ontology unit 204-3 to determine an ontology of user project data 302 and general data 310. The ontology may be referred to as the ontology after the update and include interrelationships between the user project data (e.g., the newly received user project data) and the general data. In some embodiments, step 502 may be similar to step 410, and the detailed description is not repeated herein.

In step 504, processor 204 may employ tag unit 204-4 to determine one or more tags associated with the general data using the ontology. In step 506, processor 204 may employ tag unit 204-4 to determine whether the tags associated with the general data have changed. In some embodiments, tag unit 204-4 may compare the tags, determined in step 504, associated with each set of reference project data in the general data are different from the tags prior to step 504. If, in step 508, processor 204 determines the tags associated with a set of reference project data are changed, processor 204 may proceed to step 510, in which processor 204 may employ ontology unit 204-3 to update the ontology and tag unit 204-4 to update the tags associated with the set reference project data. If, in step 508, processor 204 determines the tags associated with each set of reference project data stay the same, processor 204 may proceed to step 512, in which processor 204 may employ ontology unit 204-3 to maintain the ontology (e.g., the ontology generated in step 502 or the ontology after the update) and tag unit 204-4 to maintain the tags associated with each set of reference project data. In some embodiments, the stored ontology and tags associated with the general data each reflects the most recent update. In various embodiments, the incorporation of the user project data, in the computation of the ontology, may or may not cause the ontology to change.

Embodiments of the present disclosure provide a system for analyzing a user project. The system includes a memory that stores computer-readable instructions and at least one processor communicatively coupled to the memory. The computer-readable instructions, when executed by the at least one processor, cause the at least one processor to perform operations including accessing a first set of metadata associated with the user project, accessing a second set of metadata associated with a plurality of reference projects, and determining an ontology based on at least the first and second sets of metadata respectively associated with the user project and the plurality of reference projects. The ontology represents interrelations between the user project and the plurality of reference projects under a framework of categories. The operations also include determining, based on the ontology, a subgroup of reference projects from the plurality of reference projects. Each reference project in the subgroup has a level of relevance to the user project exceeding a threshold. The operations further include determining an assessment model for assessing at least one metric of the user project based on the subgroup of reference projects, and applying the assessment model to the first set of metadata to generate an assessment outcome.

In some embodiments, the operations include at least one of extracting the first set of metadata from the user project after receiving the user project or obtaining the first set of metadata associated with the user project from a software repository.

In some embodiments, the operations include obtaining the plurality of reference projects from one or more work-tracking software and extracting the second set of metadata from the obtained plurality of reference projects.

In some embodiments, the operations include obtaining the second set of metadata associated with the plurality of reference projects from one or more software repositories.

In some embodiments, the operations include storing the second set of metadata in a database and augmenting the first set of metadata into the database.

In some embodiments, the operations include generating a report based on the assessment outcome. The report includes at least one of a predicted success rate of the user project, a predicted time duration of the user project, a predicted issue of the user project, a predicted programming defect of the user project, or a recommendation to improve the user project.

In some embodiments, the first set of metadata associated with the user project includes processed data based on raw data of the user project and the second set of metadata associated with the plurality of reference projects includes processed data based on raw data of the plurality of reference projects.

In some embodiments, the operations include extracting text data from the user project and the plurality of reference projects, determining numerical representations of the text data, and determining a NLP model based on the first set of metadata, the second set of metadata, and the numerical representations. The operation also include determining the ontology using the NLP model.

In some embodiments, the operations include updating the plurality of reference projects and determining the second set of metadata after updating the plurality of reference projects.

In some embodiments, the operations include determining, from the framework of categories, a subset of categories associated with the user project based on the ontology.

In some embodiments, determining, based on the ontology, the subgroup of reference projects includes determining, for each of the plurality of reference projects, a corresponding level of relevance based on a number of categories associated with that reference project that matches one or more categories in the subset of categories associated with the user project. In some embodiments, determining, based on the ontology, the subgroup of reference projects also includes selecting one or more reference projects to be included in the subgroup when the corresponding levels of relevance exceed the threshold.

In some embodiments, determining, based on the ontology, the subgroup of reference projects includes selecting one or more reference projects sharing a same subset of categories to be included in the subgroup.

In some embodiments, determining the assessment model includes determining parameters of a function between a third set of metadata associated with the references projects in the subgroup and the at least one metric using at least one of a regression method, a tree-based method, or a neural network.

In some embodiments, the third set of metadata includes at least one of a name of a user who opens an issue in at least one of the reference projects in the subgroup, a number of comments associated with the issue, a number of users contributing to the issue, a percentage of open tickets in the issue, a percentage of closed tickets in the issue, a number of comments closed per period of time, a capacity of the users contributing to the issue, a number of data sources a same issue is logged in, a length of description of each ticket, or a time of completion for each ticket. In some embodiments, the at least one metric includes at least one of a success rate or a project completion duration.

In some embodiments, the assessment outcome corresponds to a prediction of the at least one metric.

In some embodiments, the operations include determining an explainability of the assessment model with respect to the at least one metric, evaluating the at least one metric based on the explainability and the assessment outcome, and determining a recommendation based on the evaluation of the at least one metric.

In some embodiments, the operations include updating the framework of categories based on at least one of the user project, the ontology, or the plurality of reference projects.

Embodiments of the present disclosure provide a method for analyzing a user project. The method includes accessing a first set of metadata associated with the user project, accessing a second set of metadata associated with a plurality of reference projects, and determining an ontology based on at least the first and second sets of metadata respectively associated with the user project and the plurality of reference projects. The ontology represents interrelations between the user project and the plurality of reference projects under a framework of categories. The method also includes determining, based on the ontology, a subgroup of reference projects from the plurality of reference projects. Each reference project in the subgroup has a level of relevance to the user project exceeding a threshold. The method further includes determining an assessment model for assessing at least one metric of the user project based on the subgroup of reference projects and applying the assessment model to the first set of metadata to generate an assessment outcome.

In some embodiments, the method includes at least one of extracting the first set of metadata from the user project after receiving the user project or obtaining the first set of metadata associated with the user project from a software repository.

In some embodiments, the method includes obtaining the plurality of reference projects from one or more work-tracking software and extracting the second set of metadata from the obtained plurality of reference projects.

In some embodiments, the method includes obtaining the second set of metadata associated with the plurality of reference projects from one or more software repositories.

In some embodiments, the method includes storing the second set of metadata in a database and augmenting the first set of metadata into the database.

In some embodiments, the method includes generating a report based on the assessment outcome. The report includes at least one of a predicted success rate of the user project, a predicted time duration of the user project, a predicted issue of the user project, a predicted programming defect of the user project, or a recommendation to improve the user project.

In some embodiments, the method includes processing raw data of the user project to obtain the first set of metadata associated with the user project and processing raw data of the plurality of reference projects to obtain the second set of metadata associated with the the plurality of reference projects.

In some embodiments, the method includes extracting text data from the user project and the plurality of reference projects, determining numerical representations of the text data, and determining a NLP model based on the first set of metadata, the second set of metadata, and the numerical representations. In some embodiments, the method also includes determining the ontology using the NLP model.

In some embodiments, the method includes updating the plurality of reference projects and determining the second set of metadata after updating the plurality of reference projects.

In some embodiments, the method includes determining, from the framework of categories, a subset of categories associated with the user project based on the ontology.

In some embodiments, determining, based on the ontology, the subgroup of reference projects includes determining, for each of the plurality of reference projects, a corresponding level of relevance based on a number of categories associated with that reference project that matches one or more categories in the subset of categories associated with the user project. In some embodiments, determining, based on the ontology, the subgroup of reference projects includes selecting one or more reference projects to be included in the subgroup when the corresponding levels of relevance exceed the threshold.

In some embodiments, determining, based on the ontology, the subgroup of reference projects includes selecting one or more reference projects sharing a same subset of categories to be included in the subgroup.

In some embodiments, determining the assessment model includes determining parameters of a function between a third set of metadata associated with the references projects in the subgroup and the at least one metric using at least one of a regression method, a tree-based method, or a neural network.

In some embodiments, determining the third set of metadata comprises determining at least one of a name of a user who opens an issue in at least one of the reference projects in the subgroup, a number of comments associated with the issue, a number of users contributing to the issue, a percentage of open tickets in the issue, a percentage of closed tickets in the issue, a number of comments closed per period of time, a capacity of the users contributing to the issue, a number of data sources a same issue is logged in, a length of description of each ticket, or a time of completion for each ticket. In some embodiments, determining the at least one metric includes determining at least one of a success rate or a project completion duration.

In some embodiments, the method includes determining an explainability of the assessment model with respect to the at least one metric; evaluating the at least one metric based on the explainability and the assessment outcome; and determining a recommendation based on the evaluation of the at least one metric.

In some embodiments, the method includes updating the framework of categories based on at least one of the user project, the ontology, or the plurality of reference projects.

Embodiments of the present disclosure provide a non-transitory computer-readable medium storing instructions that, when executed by at least one processor, cause the at least one processor to perform a method for analyzing user project data. The method includes accessing a first set of metadata associated with the user project, accessing a second set of metadata associated with a plurality of reference projects, and determining an ontology based on at least the first and second sets of metadata respectively associated with the user project and the plurality of reference projects. The ontology represents interrelations between the user project and the plurality of reference projects under a framework of categories. The method also includes determining, based on the ontology, a subgroup of reference projects from the plurality of reference projects, wherein each reference project in the subgroup has a level of relevance to the user project exceeding a threshold. The method further includes determining an assessment model for assessing at least one metric of the user project based on the subgroup of reference projects and applying the assessment model to the first set of metadata to generate an assessment outcome.

A further aspect of the disclosure is directed to a non-transitory computer-readable medium storing instructions which, when executed, cause one or more processors to perform the methods disclosed herein. The computer-readable medium may be volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for analyzing a user project, comprising:
a memory storing computer-readable instructions; and
at least one processor communicatively coupled to the memory, wherein the computer-readable instructions, when executed by the at least one processor, cause the at least one processor to perform operations to identify a collaboration bottleneck amongst a plurality of teams of a user project, comprising:
accessing a first set of metadata associated with the user project, the first set of metadata comprising first work-tracking data contributed by a plurality of teams of the user project, the first work-tracking data comprising an epic and a plurality of replies to the epic, the plurality of replies being contributed by the plurality of teams for tracking the user project;

accessing a second set of metadata associated with a plurality of reference projects, the plurality of reference projects being distinct from the user project, the second set of metadata comprising second work-tracking data comprising a plurality of epics and a plurality of replies to the epics, the plurality of replies being contributed by a plurality of teams in each of the plurality of reference projects for tracking the reference projects;

after accessing the first and second sets of metadata, determining an ontology based on the first and second sets of metadata respectively associated with the user project and the plurality of reference projects, the ontology representing interrelations between the user project and the plurality of reference projects under a framework of categories;

after determining the ontology, determining, based on the ontology, a subgroup of reference projects from the plurality of reference projects, wherein each reference project in the subgroup has a level of relevance to the user project exceeding a threshold;

after determining the subgroup of reference projects, generating an assessment model for assessing at least one metric of the user project based on the subgroup of reference projects;

after determining the assessment model, determining a neural network for training the assessment model based on an output of the assessment model, the output corresponding to the at least one metric;

after determining the neural network, determining a third set of metadata associated with the reference projects in the subgroup;

after determining the third set of metadata, training the assessment model using the neural network and the third set of metadata;

after training the assessment model, testing the assessment model using a fourth set of metadata associated with the reference projects in the subgroup, the third set of metadata and the fourth set of metadata being non-overlapping to each other; and after the training and testing of the assessment model, applying the assessment model to the first set of metadata to generate an assessment outcome reflecting the at least one predicted metric of the user project, the at least one predicted metric reflecting the collaboration bottleneck amongst the plurality of teams of the user project; and generating a report based on the assessment outcome, wherein the report reflects the bottleneck of the user project and comprises a predicted issue of the user project.

2. The system of claim 1, wherein the operations comprise at least one of:
   extracting the first set of metadata from the user project after receiving the user project; or
   obtaining the first set of metadata associated with the user project from a software repository.

3. The system of claim 1, wherein the operations comprise at least one of:
   obtaining the plurality of reference projects from the plurality of epics from one or more collaboration tools and extracting the second set of metadata from the obtained plurality of reference projects, the plurality of epics each comprising a plurality of issues and a plurality of replies to the plurality of issues; or obtaining the second set of metadata associated with the plurality of reference projects from one or more collaboration tools.

4. The system of claim 1, wherein the report further comprises at least one of:
   a predicted success rate of the user project;
   a predicted time duration of the user project;
   a predicted programming defect of the user project; or
   a recommendation to improve the user project.

5. The system of claim 1, wherein:
   the first set of metadata associated with the user project comprises processed data based on raw data of the user project; and
   the second set of metadata associated with the plurality of reference projects comprises processed data based on raw data of the plurality of reference projects, and
   the operations comprise:
     extracting text data from the user project and the plurality of reference projects;
     determining numerical representations of the text data;
     determining a natural language processing (NLP) model based on the first set of metadata,
   the second set of metadata, and the numerical representations; and
     determining the ontology using the NLP model that comprises machine learning.

6. The system of claim 1, wherein the operations comprise:
   updating the plurality of reference projects;
   determining the second set of metadata after updating the plurality of reference projects;
   updating the ontology based on at least the first and second sets of metadata respectively associated with the user project and plurality of updated reference projects; and
   determining, based on updated ontology, the subgroup of reference projects from the plurality of updated reference projects prior to training the assessment model.

7. The system of claim 6, wherein determining, based on the ontology, the subgroup of reference projects comprises determining, from the framework of categories, a subset of categories associated with the user project based on the ontology, determining the subgroup of reference projects comprising:
   tagging text data of the predicted issue in the first set of metadata and text data of the reference projects in the second set of metadata to determine the plurality of categories associated with the reference project that matches one or more categories in the subset of categories associated with the user project;
   determining, for each of the plurality of reference projects, a corresponding level of relevance based on the number of categories;
   selecting one or more reference projects to be included in the subgroup when the corresponding levels of relevance exceed the threshold; and
   selecting one or more reference projects sharing a same subset of categories to be included in the subgroup, a number of the reference projects in the subgroup being smaller than a total number of the reference projects.

8. The system of claim 1, wherein generating the assessment model comprises:
   determining parameters of a function between the third set of metadata and the at least one metric using the neural network.

9. The system of claim 8, wherein:
the third set of metadata comprises at least one of:
a name of a user who opens an issue in at least one of the reference projects in the subgroup;
a number of comments associated with the issue;
a number of users contributing to the issue;
a percentage of open tickets in the issue;
a percentage of closed tickets in the issue;
a number of comments closed per period of time;
a capacity of the users contributing to the issue;
a number of data sources a same issue is logged in;
a length of description of each ticket; or
a time of completion for each ticket; and
the at least one metric comprises at least one of a success rate or a project completion duration.

10. The system of claim 1, wherein the operations comprise:
determining an explainability of the assessment model with respect to the at least one metric;
evaluating the at least one metric based on the explainability and the assessment outcome; and
determining a recommendation based on the evaluation of the at least one metric.

11. A method for analyzing a user project, comprising:
accessing a first set of metadata associated with the user project, the first set of metadata comprising first work-tracking data of the user project, the first work-tracking data comprising team collaboration amongst teams in the user project for tracking the user project;
accessing a second set of metadata associated with a plurality of reference projects, the plurality of reference projects being distinct from the user project, the second set of metadata comprising second work-tracking data comprising team collaboration amongst teams in each of the reference projects for tracking the reference projects;
after accessing the first and second sets of metadata, determining an ontology based on the first and second sets of metadata respectively associated with the user project and the plurality of reference projects, the ontology representing interrelations between the user project and the plurality of reference projects under a framework of categories;
after determining the ontology, determining, based on the ontology, a subgroup of reference projects from the plurality of reference projects, wherein each reference project in the subgroup has a level of relevance to the user project exceeding a threshold;
after determining the subgroup of reference projects, generating an assessment model for assessing at least one metric of the user project based on the subgroup of reference projects;
after determining the assessment model, determining a neural network for training the assessment model based on an output of the assessment model, the output corresponding to the at least one metric;
after determining the neural network, training the assessment model using the neural network and a third set of metadata associated with the reference projects in the subgroup;
after training the assessment model, testing the assessment model to evaluate the assessment model using a fourth set of metadata associated with the reference projects in the subgroup, the third set of metadata and the fourth set of metadata being non-overlapping to each other; and
after the training and testing of the assessment model, applying the assessment model to the first set of metadata to generate an assessment outcome reflecting the at least one predicted metric of the user project, the assessment outcome comprising a bottleneck of the team collaboration of the user project; and
generating a report based on the assessment outcome, wherein the report reflects the bottleneck of the user project and comprises a predicted issue of the user project.

12. A non-transitory computer-readable medium storing instructions that, when executed by at least one processor, cause the at least one processor to perform a method for analyzing user project data, the method comprising:
accessing a first set of metadata associated with the user project, the first set of metadata comprising first work-tracking data contributed by a team member of the user project, the first work-tracking data comprising data of team collaboration in a plurality of replies and reposts to a plurality of issues in in the user project for tracking the user project;
accessing a second set of metadata associated with a plurality of reference projects, the plurality of reference projects being distinct from the user project, the second set of metadata comprising second work-tracking data comprising data of team collaboration in a plurality of replies and reposts to a plurality of issues in each of the plurality of reference projects for tracking the reference projects;
after accessing the first and second sets of metadata, determining an ontology based on the first and second sets of metadata respectively associated with the user project and the plurality of reference projects, the ontology representing interrelations between the first work-tracking data and the second work-tracking data under a framework of categories;
after determining the ontology, determining, based on the ontology, a subgroup of reference projects from the plurality of reference projects, wherein each reference project in the subgroup has a level of relevance to the user project exceeding a threshold;
after determining the subgroup of reference projects, generating an assessment model for assessing at least one metric of the user project based on the subgroup of reference projects;
after determining the assessment model, determining a neural network for training the assessment model based on an output of the assessment model, the output corresponding to the at least one metric;
after determining the neural network, training the assessment model using the neural network and a third set of metadata associated with the reference projects in the subgroup;
after training the assessment model, testing the assessment model to evaluate the assessment model using a fourth set of metadata associated with the reference projects in the subgroup, the third set of metadata and the fourth set of metadata being non-overlapping to each other; and
after the training and testing of the assessment model, applying the assessment model to the first set of metadata to determine a collaboration bottleneck of the user project;
generating an assessment outcome comprising the collaboration bottleneck reflected by the at least one predicted metric of the user project; and generating a report based on the assessment outcome, wherein the report reflects the bottleneck of the user project and comprises a predicted issue of the user project.

13. The system of claim 1, further comprising training the assessment model using at least one of a regression method or a tree-based method.

14. The system of claim 1, wherein:
the first set of metadata comprises data of team collaboration in the replies amongst the teams in the user project; and
the second set of metadata comprises data of team collaboration in the replies amongst the teams in the reference projects.

15. The system of claim 2, wherein:
the one or more collaboration tools comprise at least one or Github, JIRA, Slack, or Microsoft Project.

16. The system of claim 9, wherein:
the third set of metadata comprises each one of:
a percentage of open tickets in the issue;
a percentage of closed tickets in the issue;
a number of comments closed per period of time;
a capacity of the users contributing to the issue;
a number of data sources a same issue is logged in;
a length of description of each ticket; or
a time of completion for each ticket; and
the at least one metric comprises at least one of a success rate or a project completion duration.

17. The system of claim 12, wherein each of the plurality of issues comprises one or more problems posted by a team member.

18. The system of claim 1 wherein the collaboration bottleneck comprises at least one of areas of collaboration for the plurality of teams of the user project to improve, or hiring gaps for management to bridge.

19. The system of claim 1, wherein
the assessment model comprises a function between an input and the at least one predicted metric of the user project; and
an input of the assessment model includes at least one of:
a name of a team member that opened an issue;
a number of comments in an epic;
a number of team members contributing to the epic;
a percentage of open tickets;
a percentage of closed tickets;
a number of tickets closed per period of time;
a capacity of team members contributing to the epic;
a number of data sources an epic is logged in;
a length of a description in the epic;
an expected time for epic completion; or
an average time of epic completion.

20. The system of claim 1, wherein applying the assessment model to the first set of metadata to generate the assessment outcome comprises
applying an input of the assessment model into the function to generate the assessment outcome.

* * * * *